United States Patent [19]
Botz et al.

[11] Patent Number: 5,182,423
[45] Date of Patent: Jan. 26, 1993

[54] ELECTRIC SWITCH FOR OPERATING A WINDSHIELD WIPER AND WASHER SYSTEM OF A MOTOR VEHICLE

[75] Inventors: Jakob Botz, Ingersheim; Georg Hofmann, Heilbronn-Horkheim; Adam Weber, Bietigheim-Bissingen, all of Fed. Rep. of Germany

[73] Assignee: SWF Auto-Electric, Bietigheim-Bissengen, Fed. Rep. of Germany

[21] Appl. No.: 705,222

[22] Filed: May 24, 1991

[30] Foreign Application Priority Data

May 25, 1990 [DE] Fed. Rep. of Germany ....... 4016772

[51] Int. Cl.$^5$ ............................................... H01H 9/00
[52] U.S. Cl. ..................... 200/61.54; 200/4; 200/61.27
[58] Field of Search ............. 200/4, 61.27, 61.3, 200/61.31, 61.34, 61.35, 61.54

[56] References Cited

U.S. PATENT DOCUMENTS

| | | | |
|---|---|---|---|
| 3,892,932 | 7/1975 | Erdelitsch et al. | 200/61.27 |
| 4,149,048 | 4/1979 | Winter et al. | 200/61.54 |
| 4,293,743 | 10/1981 | Iwata et al. | 200/4 |
| 4,376,236 | 3/1983 | Long et al. | 200/61.27 |
| 4,376,237 | 3/1983 | Long | 200/61.27 |
| 4,791,253 | 12/1988 | Erdelitsch et al. | 200/61.27 |

*Primary Examiner*—J. R. Scott
*Attorney, Agent, or Firm*—Robert P. Seitter; J. Gordon Lewis

[57] ABSTRACT

An electric switch for operating a windshield wiper and washer system of a motor vehicle has a switch housing, in which a switching member for operating the wiper system in a selected operation mode is swivelably mounted from a neutral position around a first axis in at least one optional position and a switch lever which, for operating the washer system from a neutral position into an operational position, is swivelably mounted on the switching member around a second axis preferably perpendicularly intersecting the first axis. By a single actuation, it is possible by switching on the washer system to also switch on the wiper system. Therefore in a first position, preferably in the neutral position of the switching member, the switch lever, when being swivelled around the second axis into an operation position, is swivelable together with the switching member compulsorily around the first axis at least to such an extent that, after release of the switch lever, the switch lever reaches, together with the switching member, a second position of the switching member.

19 Claims, 4 Drawing Sheets

ELECTRIC SWITCH FOR OPERATING A WINDSHIELD WIPER AND WASHER SYSTEM OF A MOTOR VEHICLE

BACKGROUND OF THE INVENTION

1. Field of the Invention

The invention relates to a switch which is provided for operating a windshield wiper and washer system of a motor vehicle.

Normally electric switches of this kind comprise a switching member which is swivelably mounted around a first axis in a switch housing. For operating the wiper system the switching member is brought out of a neutral position into one of several operational positions. A different operation mode of the wiper system is assigned to each operational position. Thus continual operation of the wipers with two different torques, intermittent operation in which there is an interval between one or several wiping cycles, and tip wiping operation corresponding to an operational position of the switching member are possible, from which the switching member automatically returns into the neutral position after releasing a switch lever.

SUMMARY OF THE INVENTION

The switch lever is mounted on the switching member around a second axis preferably perpendicularly intersecting a first axis. For operating the washer system the switch lever is swivelled around this second axis from a neutral position into an operational position and automatically returns into the neutral position when being released.

The object of the invention is to develop an electric switch in such a way that by swiveling the switch lever around the second axis for turning on the washer system the wiper system is also turned on. This is to be done by using easy means.

This object is achieved according to the invention by the fact that as to the electric switch, the switch lever, starting off from a first position of the switching member, when being swivelled around the second axis into an operational position, is compulsorily swivelable together with the switching member around the first axis into a second position of the switching member. Thus as to an electric switch according to the invention it is possible by simply swiveling the switch lever around the second axis to turn on both the washer system and to select an appropriate operation mode of the wiper system. Any additional electric bridging contacts or additional stationary contacts are not needed.

Preferably an electric switch according to the invention is formed in such a way that the switching member is swivelable around the first axis when turning on the washer system, if the switching member is in the neutral position. However, it is also possible to provide such compulsory swiveling of the switching member from the operational position which corresponds to an intermittent mode of operation of the wiper system. It can also be of an advantage for another operational position of the switching member which corresponds to the tip-wiping mode of operation.

Thus the compulsory swiveling of the switching member together with the switch lever around the first axis is preferably brought about by the fact that on the switch lever or on the switch housing there is a ramp with a slope, by way of which, when swiveling the switch lever around the second axis, a torque for swiveling the switch lever around the first axis acts upon the switch lever. As to the angle of inclination of the slope with respect to a plane perpendicular to the second axis, an angle of 40° to 45° has been found to be of an advantage. As to such an angle of inclination the force component acting into the direction of rotation around the first axis onto the switch lever in not too small, on the other hand by way of the ramp a relatively large swiveling angle of the switch lever and of the switching member around the first axis is produced.

The ramp and thus also a ramp glider sliding on the ramp is preferably located in such a way that, when arranging the other parts of the electric switch, the ramp must be considered only a little.

The ramp glider slides on the ramp in a defined manner, if the ramp is concentrically bent to the first axis. A ramp glider sliding on the ramp is preferably radially directed to this axis.

As to electric switches with many switching functions a technique has become common during the last few years in which a lead frame is embedded into a base plate of the switch housing due to plastic injection-molding, which lead frame forms the stationary contacts of the electric switch in sections and which simultaneously comprises sections of strip conductors attaching the sections forming the stationary contacts to connectors. If the ramp is integrally formed with the base plate of the switch housing, it is useful to attach it with the material of the base plate on its whole basic area. Thus it is avoided that there are parts of the lead frame between the ramp and the base plate. Then a large part of the ramp is bound to the base plate so that there is no danger that the forces acting upon the ramp will break off the ramp from the base plate.

Depending on the size of the swiveling angle between the first and the second positions of the switching member and on the size of the swiveling angle of the switch lever from the neutral position into the operational position around the second axis, perhaps a very flat ramp would be necessary in order to achieve the necessary swiveling around the first axis within the swiveling angle of the switch lever around the second axis. In order to avoid such a flat ramp, it is provided that both the switching positions of the switch lever and of the switching member with respect to the first axis and the switching positions of the switch lever around the second axis are determined by a sole cam and a sole cam glider, whereby either the cam or the cam glider is situated on the switch lever and the other part is situated on the switch housing. Furthermore it is provided that a tooth on the cam separating the first from the second position of the switching member is cut off and is provided with a guideway for the cam glider via which the cam glider can be brought into a position which corresponds to the second position of the switching member and to the neutral position of the switch lever with respect to the second axis. Thus it is achieved that the ramp has to shift the switching member and the switch lever only around a swiveling angle which is smaller than that which is necessary for overcoming the tip of the tooth.

By another embodiment, a delay can be caused between turning on the washer system and turning on the wiper system, the time of which delay can be determined by the person actuating the electric switch. If the switch lever is held in the operational position with respect to the second axis, the washer system is already switched on, but not the wiper system. Only after releasing the switch lever is the wiper system also switched on. In the meantime the washing water can be spread on the windshield to loosen the dirt.

BRIEF DESCRIPTION OF THE DRAWINGS

An embodiment of an electric switch according to the invention is illustrated in the drawings. By means of the figures of these drawings the invention is described in detail, in which.

DETAILED DESCRIPTION OF THE PREFERRED EMBODIMENT OF THE INVENTION

Figure 1:
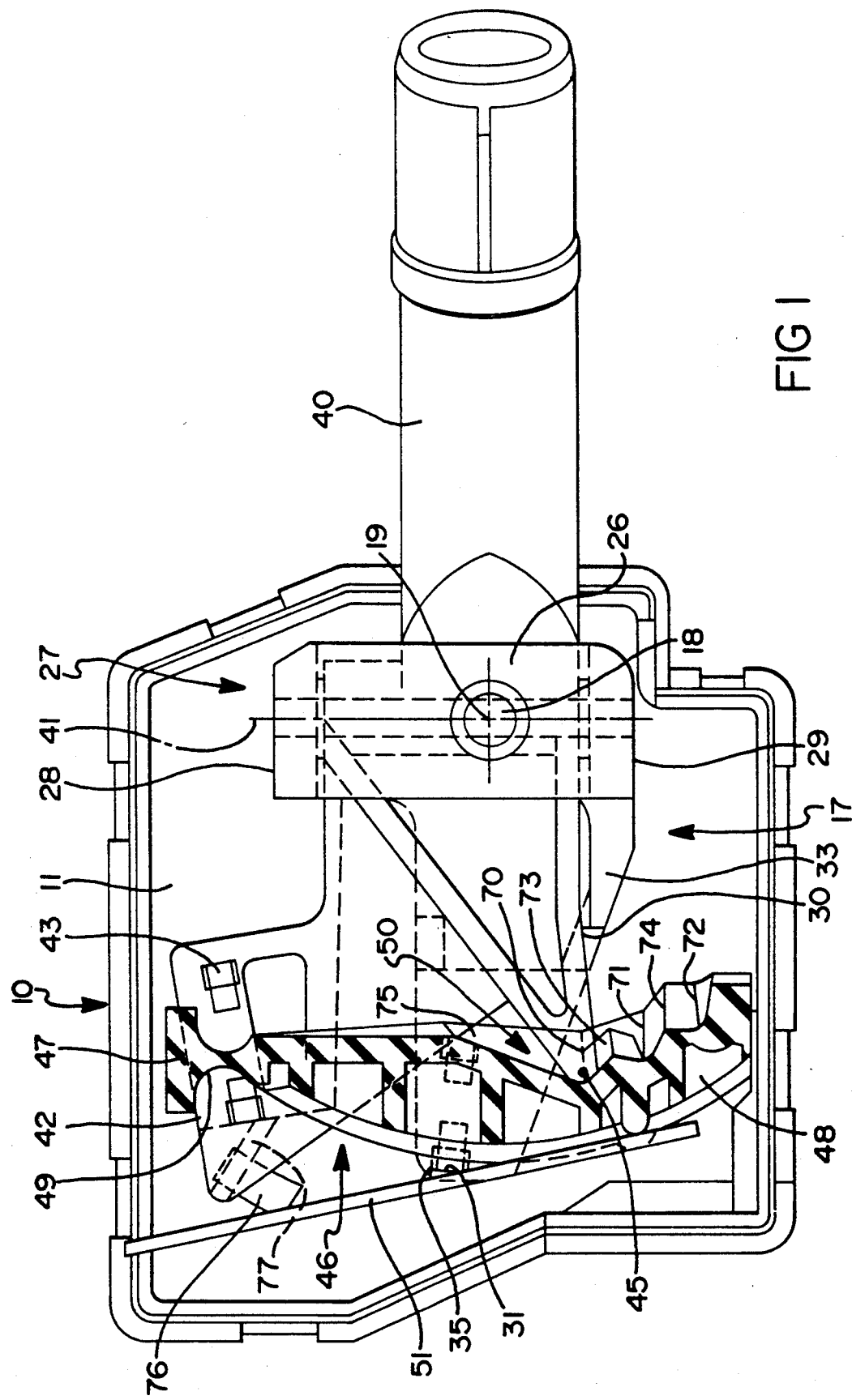
FIG. 1 is a view into the open switch housing of the embodiment in the direction of the swiveling axis of the switching member.

A switch housing 10 of the illustrated electric switch shown in FIG. 1 consists of a base plate 11 and a top 12 which are locked by means of locking lugs 13 on the base plate 11 and apertures 14 on the top 12. Base plate 11 and top 12 have aligning bearing bores 15 and 16 in which a switching member 17 with two bearing pins 18 are swivelably mounted around a first axis 19.

Figure 2:
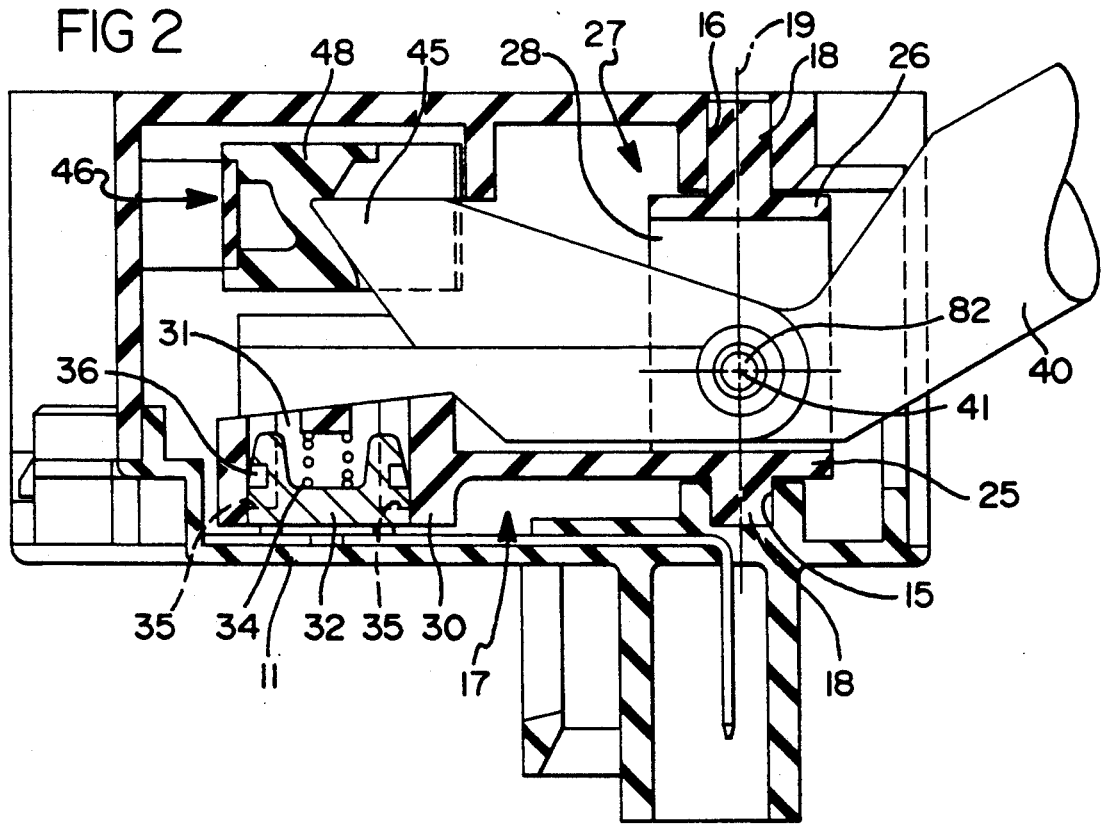
FIG. 2 is the embodiment shown in a different intersecting plane parallel to the first axis.
Figure 3:
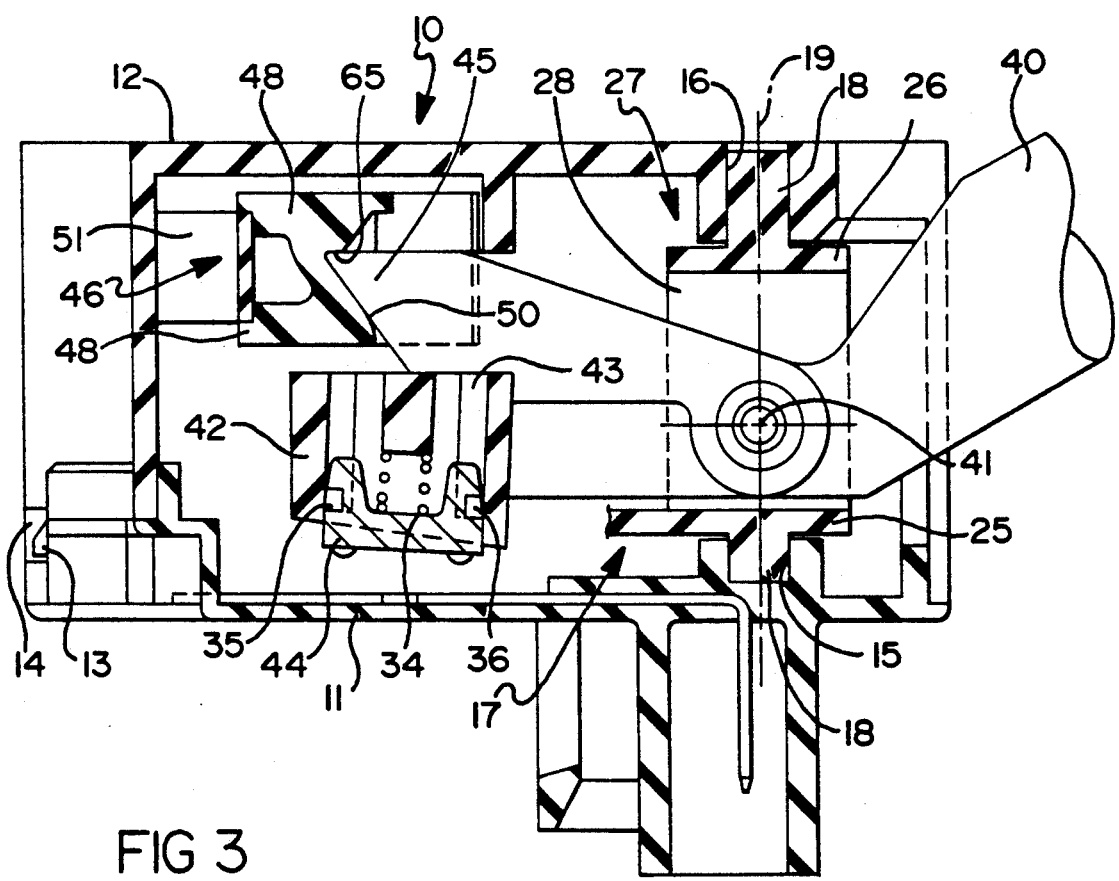
FIG. 3 is the embodiment with an additional intersecting plane parallel to the first axis.

The two bearing pins 18, FIG. 3, are located outside on two parallel sides 25 and 26 of a frame-like section 27 of the switching member 17 which is completed by way of two further sides 28 and 29 perpendicular to the sides 25 and 26 and parallel to each other. A plate-like section 30 with a receiver 31 for a first bridging contact 32 is formed onto the side 25 of the frame-like section 27. FIG. 1 shows that the plate-like section 30 of the switching member 17 is fixedly bound onto the frame-like section 27 by a rib 33 starting off from the wall 29 of the frame-like part 27 and steeply sloping from the side 26 of this section. The bridging contact 32 is pressed against the base plate 11 by a helical spring 34, FIGS. 2 and 3. By shoulders 35 in the receiver 31 and by projections 36 on the bridging contact 32, however, this bridging contact 32 is insured against getting completely pressed out of the receiver 31 during assembly by the helical spring 34.

In the frame-like section 27 of the switching member 17 a switch lever 40 illustrated in FIGS. 1-3 without a handle is mounted in such a way that it can be swivelled around a second axis 41 perpendicularly running to the first axis 19 and intersecting the first axis 19. Within the switch housing 10 the switch lever 40 integrally comprises an extension 42 with a receiver 43, which extension 42 protrudes from the side wall 28 of the switching member 17 and is located laterally to the section 30 of the switching member 17. In this receiver 43 a second bridging contact 44 is supported by means of a helical spring 34 and is mounted by means of shoulders 35 and projections 36 in the same way as the first bridging contact 32 in the receiver 31 of the switching member 17.

Above the plate-like section 30 of the switching member 17 the switch lever 40 comprises a tappet 45 by way of which it lies on a locking lever 46 the one end 47 of which is fixed onto the top 12 of the switch housing 10 in a generally known way which is not illustrated any further, but is known for instance from the U.S. Pat. No. 4,791,253, FIGS. 3 and 4. The locking lever 46 comprises a lever arm 48 which is connected with the end 47 via a film hinge 49 and has a cam 50 for the tappet 45 of the switch lever 40 which tappet 45 is to be regarded as a cam glider, and which cam 50 determines the different switching positions of the switching member 17 and the switch lever 40 with respect to the axis 19. At the back opposite of the cam 50 the lever arm 48 is supported by a leaf spring 51, the one end of which is fixed in the top 12 of the switch housing 10 in an also known manner (U.S. Pat. No. 4,791,253, FIG. 3).

Figure 5:
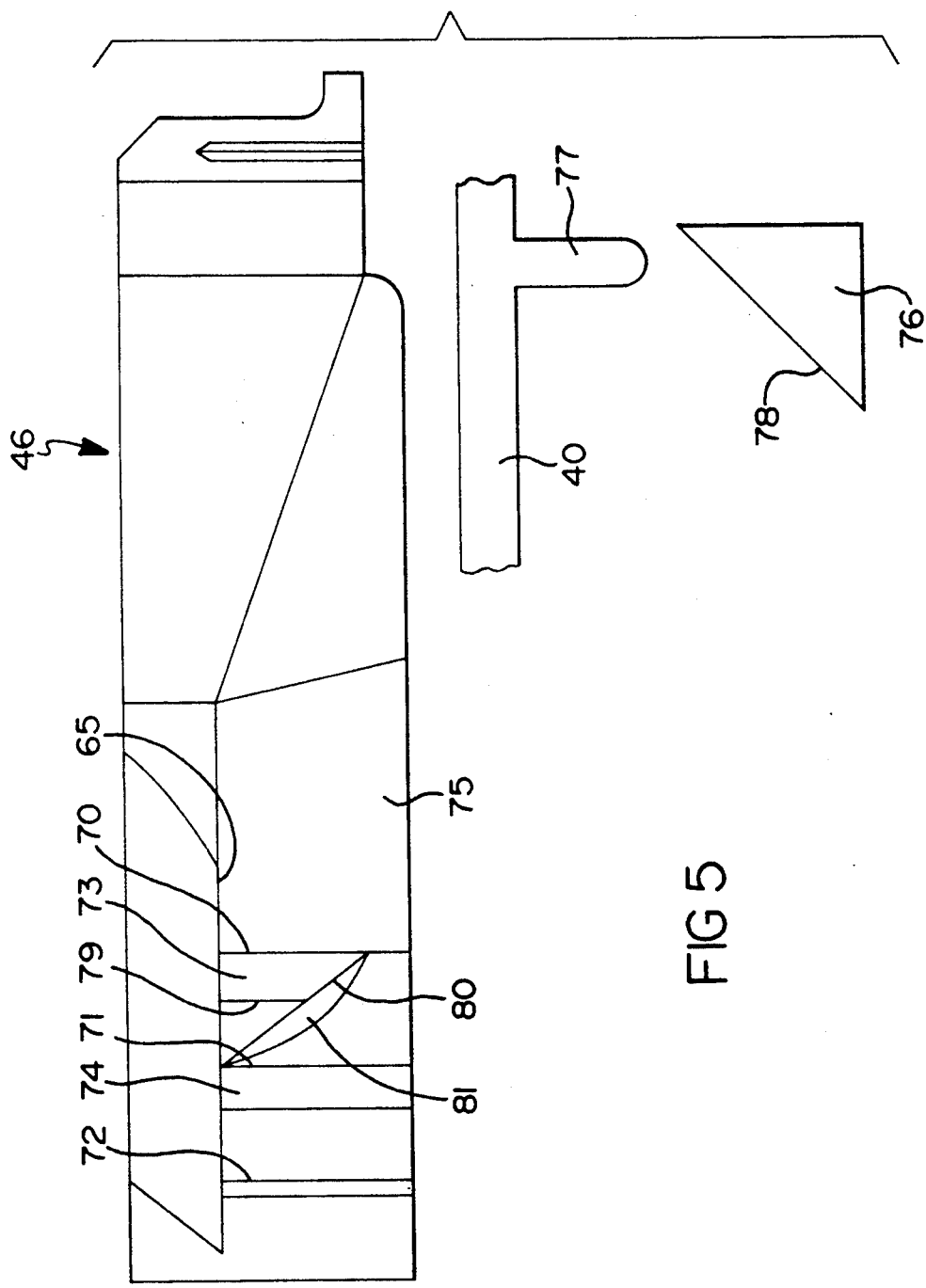
FIG. 5 is an outline of the cam, the ramp and the ramp glider.

The cam 50, looked at in the swiveling direction around the first axis 19, comprises three cavities 70, 71 and 72, FIG. 5, which are separated from each other by a roof-like tooth 73 and 74, respectively. In the neutral position of the switching member 17 the tappet 45 of the switch lever 40 is disposed in the cavity 70. The cavity 71 corresponds to a continual operation mode of the wiper system at low speed and the cavity 72 corresponds to a continual operation mode of the wiper system at high speed. If the tappet 45 of the switch lever 40 is in one of the cavities 70, 71 or 72, the switching member 17 and the switch lever 40 remain in the position previously occupied, if no outer forces act upon them. The cavities 70, 71 and 72 define stable switching positions of the switching member 17 and of the switch lever 40. Opposite the tooth 73 towards the other side there is a slope 75 next to the cavity 70, onto which slope 75 the tappet 45 of the switch lever 40 is pushed, if the switch lever 40 and the switching member 17 are swivelled, looked at according to FIG. 1, clockwise from the neutral position. The switching member 17 and the switch lever 40 automatically return from the switching position reached on the slope 75 into the neutral position, if the switch lever 40 is released. Thus the switching position on the slope 75 of the cam 50 corresponds to a tip-wiping operation which is characterized in that the wiper is only actuated as long as the switch lever 40 is held in the switching position.

Figure 4:
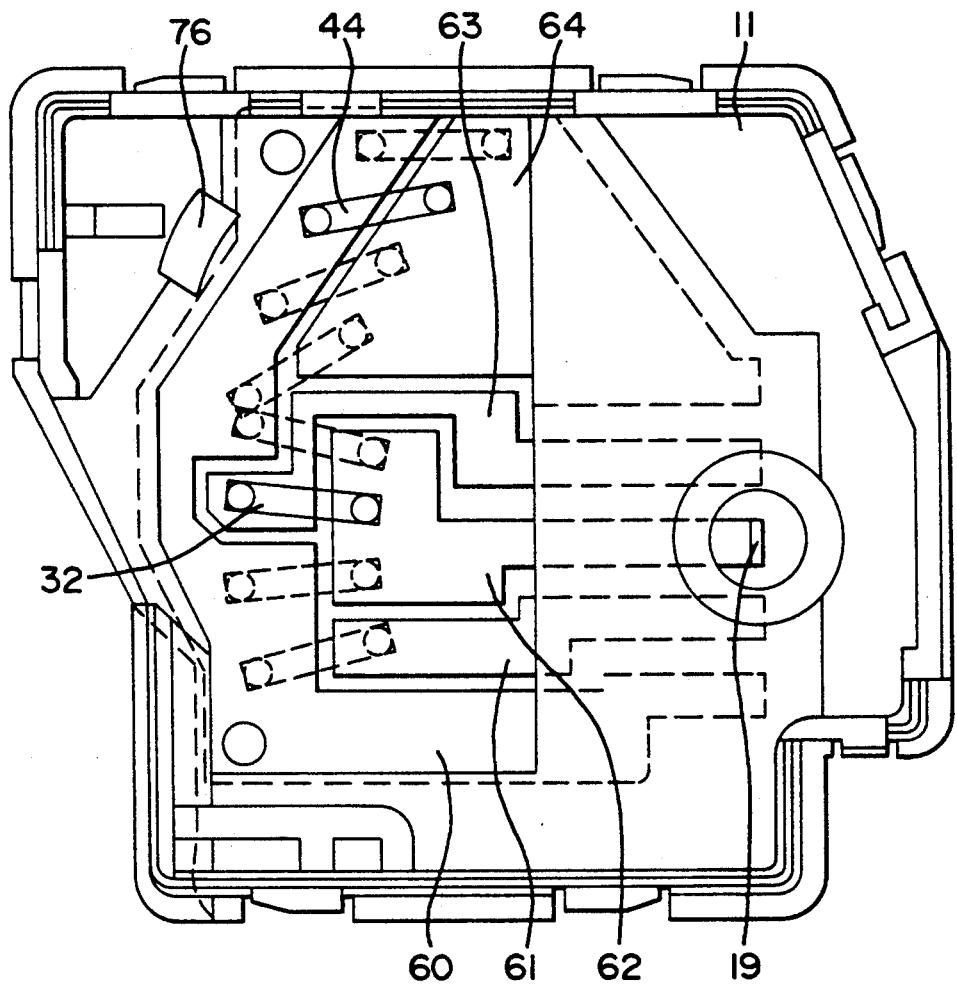
FIG. 4 is a view of a base plate provided with a lead frame.

On the base plate 11 there are five stationary contacts 60, 61, 562, 63 and 64 arranged in a metallic lead frame with which the two bridging contacts 32 and 44 cooperate and the form and arrangement of which can be gathered from FIG. 4. In FIG. 4 the bridging contacts 32 and 44 are indicated in continual lines in such positions which they occupy with respect to the axis 19, if the switching member 17 and the switch lever 40 with respect to this axis 19 are in the neutral position in which the wiper system of the motor vehicle is switched off. It can be seen that the longitudinal direction of the bridging contact 32 is identical with a radial direction with respect to the first axis 19. If the switch lever 40 is swivelled clockwise around the axis 19 according to the views illustrated in FIGS. 1 and 4, it takes along the switching member 17 and the bridging contact 32, which, in the neutral position of the switching member 17 connects the two stationary contacts 62 and 63, changes into a position which is indicated in FIG. 4 in broken lines and in which it connects the two stationary contacts 60 and 62. If the switch is used for operating a wiper system of a motor vehicle, the motor of this wiper system rotates at low speed. The tappet 45 of the switch lever 40 is shifted along the cam 50 on the slope 75. If the switch lever 40 is released again, the switch lever 40 and switching member 17 return into the neutral position due to the slope 75 of the cam 50.

When the switch lever 40 and the switching member 17 are swivelled counterclockwise from the neutral position, the bridging contact 32 again connects the two stationary contacts 60 and 62. However, after being released the switch lever 40 does not automatically return into the neutral position. Thus, this switching position corresponds to a continual operation of the wiper system at a low speed of the driving electric motor. If the switching lever 40 and the switching member 17 are further swiveled counter-clockwise, the bridging contact 32 connects the two stationary contacts 60 and 61. In this case the wiper system is operated at a higher speed of the electric motor.

The bridging contact 44 also makes the swiveling movements of the switch lever 40 around the first axis 19. The different positions which it occupies with respect to the axis 19 are indicated in broken lines in FIG. 4. It can be seen that, in the position which the switch lever 40 reaches when swivelled clockwise from the neutral position, in its longitudinal direction the bridging contact 44 is arranged in parallel to the adjacent side wall of the base plate 11 so that the space available in the switch housing 10 can be used best.

FIG. 3 makes clear that the cam 50 does not run in parallel to the axis 19, but slopingly to it to such an extent that its distance from the axis 19 becomes smaller towards the base plate 11. Therefore the cam always swivels the switch lever 40 clockwise, looked at according to FIGS. 2 and 3, to such an extent that the tappet 45 lies on a stop 65 of the locking lever 46 extending along the cam 50. If the switch lever 40 is not swivelled around the second axis 41 by outer forces, the tappet 45 lies on the stop 65 and the bridging contact 44, as can be seen in FIG. 3, at a distance from the stationary contacts on the base plate 11. This applies to all switching positions of the switching member 17 and of the switch lever 40 with respect to the axis 19. If the switch lever 40 is swivelled counterclockwise around the axis 41 from the neutral position shown in FIGS. 2 and 3, the bridging contact 44 acts upon the two stationary contacts 60 and 64, whereby the contact points, depending on the switching position of the switching member 17, differ. Due to the contact between the two stationary contacts 60 and 64 a washer system is actuated and water is sprayed onto the windshield of the motor vehicle. Thus this can be done in each switching position of the switching member 17. After releasing the switch lever 40, the switch lever 40 returns into the original neutral position due to the slope of the cam 50 and due to the leaf spring 51. However, a peculiarity has to be taken into consideration, if the switching member 17 is in its neutral position.

In the illustrated electric switch the afore-mentioned peculiarity has been taken care of in that the switching member 17 and also the switch lever 40 are swivelled around the first axis 19 from the neutral position into the operational position, in which the tappet 45 of the switch lever 40 is located in the cavity 71 of the cam 50, if the switch lever 40 in the neutral position of the switching member 17 is swivelled around the second axis 41. This is mainly achieved by means of a ramp 76 located on the base plate 11 and by a ramp glider 77 on the switch lever 40.

As it can be seen in FIGS. 1 and 4, with respect to the first axis 19, the ramp 76 is situated beyond the locking lever 46 and beyond the ways of the two bridging contacts 32 and 44. The ramp 76 is also at a larger distance from the axis 19 than the point of the switching member 17 that is the most distant from the first axis 19. The switch lever 40 projects the switching member 17 and the locking lever 46 over the ramp 76. There the ramp glider 77, FIG. 5, is formed on the ramp 76 in the shape of a rib. The angle of inclination of the slope 78 of the ramp 76 is a little more than 40°. Besides, the ramp 76 is concentrically arranged with respect to the first axis 19, whereas the ramp glider 77 runs radially to this first axis 19.

In the neutral position of the switching member 17, the ramp glider 77 is above the slope 78 in the position further illustrated in FIG. 5. If, for turning on the washer system, the switch lever 40, looked at according to FIGS. 2 or 3, is swivelled counterclockwise around the second axis 41, after a short way the ramp glider 77 reaches the slope 78 and is guided along the slope 78 when further swiveling the switch lever 40 around the second axis 41. Thus, the switching member 17 and the switch lever 40 are also swivelled around the axis 19. At first the tappet 45 on the switch lever 40 glides in the cavity 70 along the cam 50 and is, as soon as the ram glider 77 reaches the slope 78, shifted over the tooth 73 after some time. In order not to form the slope very flat, this tooth 73, as it can be seen in FIGS. 1 and 5, is cut in such a sloping manner that its tip 79 is only half the length of the height of the cam 50. The tip 79 slopingly ends in an edge 80 in the cavity 70. The intersecting area of the tooth 73 forms a guide 81, along which the tappet 45 gets into the cavity 71, if, after the tappet 45 having passed the edge 80, the switch lever 40 is released. Thus, due to the cutting off of the tooth 73, it is not necessary that the ramp 76 swivels the switching member 17 and the switch lever 40 beyond the tip 79 of the tooth 73.

The swiveling angle around the axis 19 caused by the ramp 76, the position of the edge 80 of the tooth 73, and the swiveling angle of the switching member 17 for the change of the bridging contact 32 from the stationary contacts 62 and 63 to the stationary contacts 62 and 60 are adapted to each other in such a way that the tappet 45 on the switch lever 40 has already overcome the edge 80, however, the two stationary contacts 60 and 62 have not yet been connected with each other by the bridging contact 32, when the ramp glider 77 reaches the foot of the slope 78 and thus the switch lever 40 is already totally swivelled around the axis 41 so that the bridging contact 44 connects the two stationary contacts 64 and 60 with each other. This means that washing water has already been sprayed onto the windshield of the motor vehicle, but the wiper system has not yet been switched on. Only after releasing the switch lever 40, the switch lever 40 and the switching member 17 are further swivelled around the axis 19 and thus the wiper system is switched on. By holding the switch lever 40 in the operational position with respect to the axis 41, turning on the wiper system can arbitrarily be delayed for some time with respect to turning on the washer system.

Acting upon the stationary contacts 60 and 64 by the bridging contact 44 and acting upon the ramp 76 by the ramp glider 77 are both carried out far outside a plane perpendicular to the axis 41 and intersecting the axis 19. Therefore the frame-like section 27 of the switching member 17 is formed in such a way that, looked at in the direction of the second axis 41, it is farther from the first axis 19 towards the side of the plane mentioned, on which side the bridging contact 44 and the ramp 76 are located, than towards the other side. Thus it is achieved that a bearing pin 82, by way of which the switch lever 40 is mounted in the two sides 28 and 29 of the frame-like section 27 of the switching member 17, is still supported far outside so that the tilting moment acting upon the bearing point of the switch lever 40 is small.

What is claimed is:

1. An electrical switch comprising:
   a switch housing assembly;
   a switching member mounted in said housing assembly for rotation about a first axis between first and second operating positions;
   lever means mounted upon said switching member for rotation about a second axis angularly offset from said first axis between first and second actuating positions; and
   engagement means, mounted on the switch housing assembly and the lever means, for engaging the lever means and the switching lever upon rotation of said lever means between said actuating positions, for displacing said switching member from said first operating position to said second operating position.

2. The electrical switch of claim 1 wherein the engagement means comprises:
   a ramp mounted on the switch housing assembly, the ramp having a slope; and
   a ramp glider mounted on the lever means and engaging the ramp during rotation of the lever means about the second axis to simultaneously rotate the lever means and the switching member mounted thereon about the first axis.

3. A multi-functional electric switch comprising:
   a switch housing assembly;
   a switching member mounted in said housing assembly for rotation about a first axis between prescribed switch settings;
   lever means mounted upon said switching member for limited rotation about a second axis angularly offset from said first axis between first and second actuating positions wherein said lever means is manipulable to selectively position said switching member in one of said switch settings by rotation of said switching member about said first axis and said lever means is positionable between said actuating positions by rotation about said second axis; and
   engagement means mounted on the switch housing assembly and the lever means and operative upon rotation of said lever means from said first actuating position to said second actuating position and the subsequent return to said first actuating position, for altering the setting of said switching member.

4. The multi-function electric switch of claim 3, further comprising means for biasing said lever means toward said first actuating position.

5. The multi-function electric switch of claim 4, further comprising:
   an array of fixed electrically isolated contact pads;
   a first bridging contact carried by said switching member and positioned to overlay a varying plurality of said contact pads in each switch setting to establish a unique electrically conductive path for each switch setting; and
   a second bridging contact carried by said lever means and positioned to overlay a fixed plurality of contact pads to establish an open conductive path therebetween when said lever means is in said first actuating position and a closed conductive path therebetween when said lever means is in said second actuating position.

6. The electrical switch of claim 3 wherein the engagement means comprises:
   a ramp mounted on the switch housing assembly, the ramp having a slope; and
   a ramp glider mounted on the lever means and engaging the ramp during rotation of the lever means about the second axis to simultaneously rotate the lever means and the switching member mounted thereon about the first axis.

7. An electric switch for operating a windshield wiper and washer system of a motor vehicle comprising:
   a switch housing in which a switching member for operating the wiper system in a selected operation mode is swivelably mounted about a first axis for movement from a neutral position into at least one operational position;
   a switch lever for operating the washer system swivelably mounted on the switching member and movable from a neutral position into an operational position around a second axis intersecting the first axis, wherein in a first position of the switching member, the switch lever, when swivelled around the second axis into an operational position, is swivelable, together with the switching member, compulsorily around the first axis at least to such an extent that, at least after being released, the switch lever together with the switching member reaches a second position of the switching member.

8. The electric switch according to claim 7, further comprising a ramp with a slope, the ramp with a slope engaging the switch lever, when the switch lever is swivelled around the second axis, and generating a torque acting on the switch lever to swivel the switch lever around the first axis.

9. The electric switch according to claim 8 wherein an angle of inclination of the slope with respect to a plane perpendicular to the first axis is about 40° to 45°.

10. The electric switch according to claim 8, wherein in a radial direction to the first axis the switch lever projects the switching member and the ramp a larger distance from the first axis than the point of the switching member that is the most distant from the first axis.

11. The electric switch according to claim 8, wherein on the switching member and on the switch lever at least one bridging contact each is held and wherein the ramp is a larger distance from the first axis than the bridging contacts are from the first axis.

12. The electric switch according to claim 8, wherein in the switch housing a locking lever extends crosswise to the switch lever, wherein the switch lever, in the direction of the swivelling axis of the locking lever, projects beside the locking lever, and wherein the ramp, in a direction from the first axis, is located beyond the locking lever.

13. The electric switch according to claim 8, wherein the ramp is an arcuate segment radially spaced from the first axis.

14. The electric switch according to claim 13, wherein a ramp glider slides along the ramp and is radially directed to the first axis.

15. The electric switch according to claim 8, wherein the ramp is integrally located on the base plate of the switch housing, and wherein a metallic lead frame is fixed into the base plate.

16. The electric switch according to claim 8, wherein both of the switching positions of the switch lever and of the switching member with respect to the first axis and the switching positions of the switch lever around the second axis are determined by a sole am and a sole cam glider, whereby the cam is located on one of the switch lever and the switch housing and the cam glider is located on the other of the switch housing and the switch lever, and wherein a tooth on the cam separating the first position from the second position of the switching member is cut off and is provided with a guideway for the cam glider, by way of which the cam glider can be driven into a position which corresponds to the second position of the switching member and to the neutral position of the switch lever with respect to the second axis.

17. The electric switch according to claim 16, wherein an elongated tip of the tooth slopingly ends in an edge in the cavity of the cam determining the first position of the switching member.

18. The electric switch according to claim 16, wherein the length of the tooth is shorter than the height of the cam.

19. The electric switch according to claim 17, wherein the ramp and the tip of the tooth are arranged such that the switching member, when the switch lever is swivelled around the second axis from the neutral position into the operational position, is compulsorily swivelable around a predetermined angle around the first axis, which predetermined angle is not yet sufficient for turning on the operation mode of the wiper system corresponding to the second position of the switching member, and wherein the switching member and the switch lever, after release of the switch lever to the neutral position, automatically swivel into the second position of the switching member, whereby the operation mode of the wiper system corresponding to the second position of the switching member is turned on.

* * * * *